United States Patent
Ben Zeev et al.

(10) Patent No.: US 11,281,404 B2
(45) Date of Patent: Mar. 22, 2022

(54) STORAGE VOLUME MIGRATION SCHEDULING BASED ON STORAGE VOLUME PRIORITIES AND SPECIFIED CONSTRAINTS

(71) Applicant: EMC IP Holding Company LLC, Hopkinton, MA (US)

(72) Inventors: Gil Ben Zeev, Haifa (IL); Evgeny Katz, Haifa (IL); Zeev Shusterman, Haifa (IL); Tamir Segev, Haifa (IL); Lior Oded Bahat, Kerem Maharal (IL); Nir Brifman, Kfar Netter (IL); Itai Rosenblatt, Haifa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 67 days.

(21) Appl. No.: 16/830,946

(22) Filed: Mar. 26, 2020

(65) Prior Publication Data

US 2021/0303202 A1    Sep. 30, 2021

(51) Int. Cl.
*G06F 3/06* (2006.01)
*G06F 9/48* (2006.01)
*G06Q 10/06* (2012.01)

(52) U.S. Cl.
CPC .......... *G06F 3/0659* (2013.01); *G06F 3/0604* (2013.01); *G06F 3/0647* (2013.01);
(Continued)

(58) Field of Classification Search
CPC .... G06F 3/0659; G06F 9/4881; G06F 3/0604; G06F 3/0673; G06F 3/0647; G06Q 10/06314
See application file for complete search history.

(56) References Cited

U.S. PATENT DOCUMENTS 5,551,003 A    8/1996 Mattson et al.
5,764,880 A    6/1998 Gerdt et al.
(Continued)

FOREIGN PATENT DOCUMENTS

WO PCT/US2019/024885    1/2020
WO PCT/US2019/024900    1/2020

OTHER PUBLICATIONS

Dell EMC, "Dell EMC VxRack FLEX," Dell EMC Product Overview, 2018, 5 pages.
(Continued)

*Primary Examiner* — Sean D Rossiter
(74) *Attorney, Agent, or Firm* — Ryan, Mason & Lewis, LLP

(57) ABSTRACT

Techniques are provided for scheduling storage volume migrations based on storage volume priorities and specified constraints. One method comprises generating a migratable volume list indicating storage volumes that can be migrated by evaluating available storage volumes according to an assigned priority and adding a storage volume to the migratable volume list in response to one or more constraints being satisfied that limit a migration of one or more of the storage volumes; and scheduling a migration of a volume part of a given storage volume from the migratable volume list based at least in part on a reevaluation of one or more of the constraints. The migratable volume list can be sorted by the assigned priority for each of the storage volumes. The migratable volume list can be regenerated in response to an event occurring that modifies the migratable volume list.

20 Claims, 5 Drawing Sheets

(52) U.S. Cl.
CPC .......... *G06F 3/0673* (2013.01); *G06F 9/4881* (2013.01); *G06Q 10/06314* (2013.01)

(56) References Cited

U.S. PATENT DOCUMENTS

| | | | |
|---|---|---|---|
| 6,052,799 | A | 4/2000 | Li et al. |
| 6,941,420 | B2 | 9/2005 | Butterworth et al. |
| 9,372,751 | B2 | 6/2016 | McNutt |
| 9,514,014 | B2 | 12/2016 | Webman et al. |
| 10,445,180 | B2 | 10/2019 | Butterworth et al. |
| 2002/0032835 | A1 | 3/2002 | Li et al. |
| 2012/0131196 | A1* | 5/2012 | Yamada .............. G06F 11/3442 709/226 |
| 2012/0185426 | A1* | 7/2012 | Mori ....................... G06F 16/10 707/609 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0220214 | A1* | 7/2019 | Mio ....................... G06F 3/0658 |
| 2019/0227845 | A1 | 7/2019 | Sridhar et al. |
| 2019/0235918 | A1* | 8/2019 | Liu ....................... G06F 3/0647 |
| 2021/0089224 | A1* | 3/2021 | Beeston .............. G06F 11/2094 |
| 2021/0103399 | A1* | 4/2021 | Lyu ....................... G06F 3/0653 |
| 2021/0223977 | A1* | 7/2021 | Suzuki .................. G06F 3/0676 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 12 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

U.S. Appl. No. 16/343,942 filed in the name of Yonatan Shtarkman et al., filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al., filed Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al., filed Mar. 3, 2020, and entitled "Management of Shared Resources in a Software-Defined Storage Environment."

U.S. Appl. No. 16/822,818 filed in the name of Itay Keller et al., filed Mar. 18, 2020, and entitled "Storage System Implementing Snapshot Longevity Ranking for Efficient Management of Snapshots."

U.S. Appl. No. 16/822,848 filed in the name of Itay Keller et al., filed Mar. 18, 2020, and entitled "Assignment of Longevity Ranking Values of Storage Volume Snapshots Based on Snapshot Policies"

U.S. Appl. No. 16/823,813 filed in the name of Itay Keller et al., filed Mar. 19, 2020, and entitled "Managing Incompressible Data in a Compression-Enabled Log-Structured Array Storage System."

\* cited by examiner

Volume Part Migration 400

1. Allocate Empty Volume Part in Migration Destination
2. Copy Contents of Volume Part from Source to Destination
2.1 Source Data Servers Each Iterate Over Their Mapped Parts of Volume Part, Reading Data from Storage Device and Sending Data to Destination Data Servers
2.2 Destination Data Servers Write Given Data at Storage Device and Offset Corresponding to Offset in Volume Part
2.3 If Any New Write Operations Arrive While Copying, New Write Operation is Synchronously Written to Both Source and Destination
2.4 If there is an error (e.g., Hardware Failure, No More Space in Destination, etc.) Migration of Volume Part is Aborted and Source Volume Part is Used As Before
3. When Data Copying is Complete, Ownership of Serving User I/Os Moves to Destination Group of Devices
3.1 Notify Source Servers to Stop Serving I/Os
3.2 Enable Destination Servers to Serve I/Os
3.3 Client is Notified About New Location of Volume Part
3.4 Delete Source Volume Part
3.5 If Error Occurs in Steps 3.1, 3.2, 3.3 or 3.4, Move Forward with Process, as Data Finished Moving so Error is Handled as Normal Error

FIG. 4

STORAGE VOLUME MIGRATION SCHEDULING BASED ON STORAGE VOLUME PRIORITIES AND SPECIFIED CONSTRAINTS

FIELD

The field relates generally to information processing techniques, and more particularly, to techniques for the storage of data.

BACKGROUND

In a storage system, storage devices store at least a portion of one or more storage volumes. Storage volume migration migrates the volume data from one storage volume to another storage volume, for example, to move storage volumes to a new storage system (e.g., when replacing a storage system or portions thereof). Storage volume migration is often important for storage system upgrades, maintenance and/or consolidation, and is typically performed in an automated manner.

A need exists for improved techniques for scheduling a migration of storage volumes.

SUMMARY

In one embodiment, a method comprises generating a migratable volume list indicating a plurality of storage volumes that can be migrated by evaluating available storage volumes according to an assigned priority and adding a storage volume to the migratable volume list in response to one or more constraints being satisfied that limit a migration of one or more of the storage volumes; and scheduling a migration of a volume part of a given storage volume from the migratable volume list based at least in part on a reevaluation of one or more of the constraints.

In at least some embodiments, the migratable volume list is regenerated in response to an event occurring that modifies the migratable volume list. For example, the event can comprise: adding a new storage volume to migrate; changing the priority of a storage volume; finishing the migration of a storage volume; changing a direction of a migration; receiving a user command to one or more of pause a migration, resume a migration and remove a storage volume; and/or receiving a notification that one or more storage devices are not available.

Other illustrative embodiments include, without limitation, apparatus, systems, methods and computer program products comprising processor-readable storage media.

BRIEF DESCRIPTION OF THE DRAWINGS

FIG. 4 illustrates exemplary pseudo code for a volume part migration process, according to an embodiment.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for scheduling storage volume migrations based on storage volume priorities and specified constraints.

One or more aspects of the disclosure recognize that when migrating storage volumes, each volume has a different priority, and different resources are consumed as part of the migration. In one or more embodiments, the storage volume with a highest priority and that satisfies one or more specified constraints (e.g., with the necessary resources currently available) is migrated.

In some embodiments, the storage volumes having the highest priority are migrated with one or more constraints. For example, exemplary constraints may comprise one or more of:

only migrate the storage volumes for which the necessary resources to migrate (e.g., storage disks) are currently available;

do not cancel migration of a given volume part once the migration has been started; and select migrations to schedule in a manner that does not consume an excessive amount of processing resources (e.g., by re-calculating too often).

Figure 1:
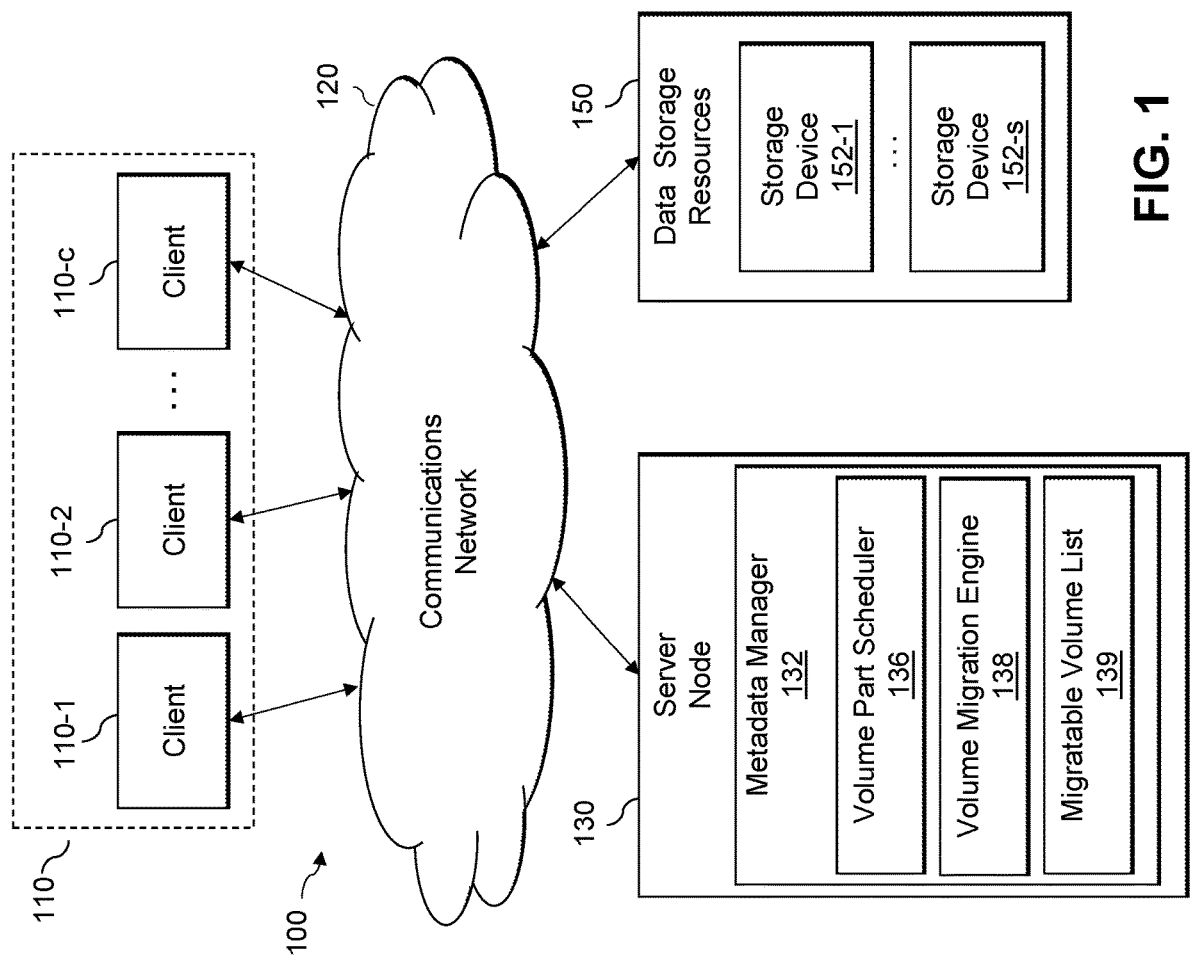
FIG. 1 is a high-level schematic illustration of a computing system comprising a software-defined storage control system that implements a process for scheduling storage volume migrations using volume part migration based on storage volume priorities and specified constraints, according to an exemplary embodiment of the disclosure.

FIG. 1 is a high-level schematic illustration of a computing system comprising a software-defined storage system that implements a process for scheduling storage volume migrations based on storage volume priorities and specified constraints, according to an exemplary embodiment of the disclosure. More specifically, FIG. 1 schematically illustrates a computing system 100 which comprises a plurality of client applications 110-1, 110-2, . . . , 110-c (collectively referred to as client applications 110), a communications network 120, one or more server nodes 130 and data storage resources 150. One or more server nodes 130 may comprise a software-defined storage (SDS) control system (not shown in FIG. 1). The data storage resources 150 comprise a plurality of storage devices 152-1 through 152-s (collectively referred to as storage devices 152).

The client applications 110 include various types of applications that issue data I/O (input/output) requests to access and store data to and from the data storage devices 152 of the data storage resources 150 of the server nodes 130. For example, the client applications 110 include user applications, server applications, database applications, virtual machines and containers. The client applications 110 can be hosted by, and execute on, various types of computing devices and systems including, but not limited to, desktop computers, laptop computers, workstations, computer servers, enterprise servers, rack servers, smart phones and electronic tablets.

While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, and an iSCSI (Internet Small Computer Systems Interface) data transfer protocol, to support storage network connectivity.

In some embodiments, the data storage resources 150 comprise direct-attached storage (DAS) resources (internal and/or external storage resources of the server node 130), wherein the storage devices 152 are virtually pooled into shared block storage by the SDS system. For example, the storage devices 152 include the same type, or a combination of different types of persistent storage devices (e.g., physical block devices) such as hard disk drives (HDDs), solid-state drives (SSDs) (e.g., flash storage devices), PCIe flash cards, or other types and combinations of non-volatile memory. The data storage resources 150 are directly connected to the server node 130 through, e.g., a host bus adapter, and using suitable protocols such as ATA, SATA, eSATA, NVMe, SCSI and SAS. In an exemplary embodiment, the storage devices 152 include both HDD and SSD storage devices. As is known in the art, SSD storage devices provide faster storage performance than HDD devices.

In at least one embodiment, the data storage resources 150 employ a distributed storage system that provides a volume tree migration ability.

In one or more embodiments, storage volumes are allocated (and migrated) in portions referred to herein as volume parts. Each volume part represents a continuous part of the address space of a virtual volume. When a volume is allocated, as many volume parts as needed are allocated. Each volume part is typically spread across a plurality of storage devices.

While FIG. 1 generally depicts the software-defined storage environment having a single server node 130, it is to be understood that in other embodiments, the system 100 of FIG. 1 can implement a server cluster of two or more server nodes 130 (e.g., hundreds of server nodes), wherein each server node 130 deploys its own SDS control system. In this instance, the SDS control system of each server node contributes the block storage to the server cluster to implement a server-based storage area network (SAN) (e.g., virtual SAN), wherein each server node is part of a loosely coupled server cluster which enables "scale-out" of the software-defined storage environment. In the software-defined storage environment of FIG. 1, for purposes of discussion, the term "node" or "server node" as used herein refers to a single server node (e.g., one server node 130) which comprises physical block devices (e.g., HDD devices and SSD devices). The SDS control system exposes abstractions of block devices (e.g., virtual block devices). For example, a virtual block device can correspond to a volume of a storage pool. Each virtual block device comprises any number of actual physical storage devices, which are referred to herein as "storage pools." For illustrative purposes, it is assumed that each "storage pool" is homogenous in terms of the type of storage devices within the group (e.g., a storage pool can include only HDD devices or SSD devices). In addition, different storage pools can have the same type of storage device, but a different number of storage devices. For example, a first storage pool can include 10 HDDs, a second storage pool can include 100 HDDs, a third storage pool can include 50 SSDs, and a fourth group can include 100 SSDs.

In general, a software-defined storage system has certain characteristics which provide the impetus for implementing the scheduling of storage volume migrations based on storage volume priorities and specified constraints in accordance with the present disclosure, the functions of which will explained in further detail below. It is noted that conventional approaches (i) migrate a whole storage block as one piece within the same storage pool, or (ii) migrate parts of a storage volume to storage blocks of a different storage pool (e.g., a collection of storage devices).

The SDS control system is a component of the software-defined storage environment shown in FIG. 1. In some embodiments, the software-defined storage environment comprises other components such as SDS data clients, which are not specifically shown in FIG. 1. The SDS control system comprises a software layer that is deployed on one or more server nodes 130 and configured to provision, orchestrate and manage the physical data storage resources 150. For example, the SDS control system implements methods that are configured to create and manage storage pools by aggregating capacity from the physical storage devices 152 (e.g., virtual pools of block storage). The SDS control system can divide a storage pool into one or more volumes, wherein the volumes are exposed to client applications 110 as block devices.

The SDS control system supports the virtualization of storage by separating the control and management software from the hardware architecture. The SDS control system is configured to abstract storage access services from the underlying storage hardware to thereby control and manage I/O requests issued by the client applications 110, as well as support networking and connectivity. As shown in FIG. 1, the SDS control system is deployed in the data path between the client applications 110 and the physical data storage resources 150, and is configured to respond to data I/O requests from the client applications 110 by accessing the data storage resources 150 to store/retrieve data to/from the storage devices 152 based on the I/O requests.

On the client-side, an SDS data client (SDC) is a lightweight device driver that is deployed in each host application server which hosts one or more of the client applications 110 that require access to the block devices exposed and managed by the SDS control system. The SDC exposes block devices representing the virtual storage volumes that are currently mapped to that host. In particular, the SDC serves as a block driver for a client (server) to access the block storage that is managed by the SDS control system. The SDC provides the operating system or hypervisor (which runs the SDC) access to the logical block devices (e.g., volumes). The SDCs have knowledge of which SDS control systems (e.g., SDS control system) hold its block data, so multipathing can be accomplished natively through the SDCs. The metadata managers manage SDC to SDS data mapping.

In addition, as shown in FIG. 1, the exemplary server node 130 comprises a metadata manager 132 that manages the computing system 100. The metadata manager 132 comprises the metadata required for system operation, such as configuration changes. In one or more embodiments, the metadata manager 132 manages the metadata, the SDCs, SDS, device mappings, volumes, snapshots, system capacity (e.g., device allocations and/or release of capacity), RAID protection, errors and failures, and/or system rebuild tasks (including rebalancing). In addition, user interactions with the computing system 100 are handled by the metadata manager 132 in some embodiments. In a normal input/output (I/O) flow, for example, the metadata manager 132 is not part of the data path and user data does not pass through the metadata manager 132. Therefore, the metadata manager 132 is not a performance bottleneck for I/O operations.

The exemplary metadata manager 132 also comprises a volume part scheduler 136, a volume migration engine 138 and a migratable volume list 139. In some embodiments, the exemplary volume part scheduler 136 implements a process in accordance with FIG. 3 and the exemplary volume migration engine 138 implements a process in accordance with FIG. 4.

It is to be appreciated that this particular arrangement of modules 136, 138 illustrated in the metadata manager 132 of the FIG. 1 embodiment is presented by way of example only, and alternative arrangements can be used in other embodiments. For example, the functionality associated with modules 136, 138 in other embodiments can be combined into a single module, or separated across a larger number of modules. As another example, multiple distinct processors can be used to implement different ones of modules 136, 138 or portions thereof.

In some embodiments, the metadata managers 132 are employed in clusters of at least three, for high availability in case a server node 130 becomes non-operational. It is noted that, in at least some embodiments, only one metadata manager 132 is a master metadata manager 132 at a given time. In addition, the metadata manager 132 and a data server are not required to be on the same device. More than one data server may be required in some embodiments in a given system, (e.g., for high availability three data servers are required).

At least portions of modules 136 and 138 may be implemented at least in part in the form of software that is stored in memory and executed by a processor.

It is to be understood that the particular set of elements shown in FIG. 1 for scheduling storage volume migrations based on storage volume priorities and specified constraints is presented by way of illustrative example only, and in other embodiments additional or alternative elements may be used. Thus, another embodiment includes additional or alternative systems, devices and other network entities, as well as different arrangements of modules and other components.

An exemplary process utilizing modules 136 and 138 of an example storage volume migration scheduling based on storage volume priorities and specified constraints in computing system 100 will be described in more detail with reference to FIGS. 3 and 4.

As noted above, computing system 100 comprises a software-defined storage system that implements the disclosed techniques for scheduling storage volume migrations based on storage volume priorities and specified constraints. In one exemplary implementation, the software-defined storage system may be implemented using the Dell EMC ScaleIO® software-defined storage product, commercially available from Dell EMC of Hopkinton, Mass. The Dell EMC ScaleIO™ software-defined storage product is also known as the VxFlex OS® software-defined storage product.

Figure 2:
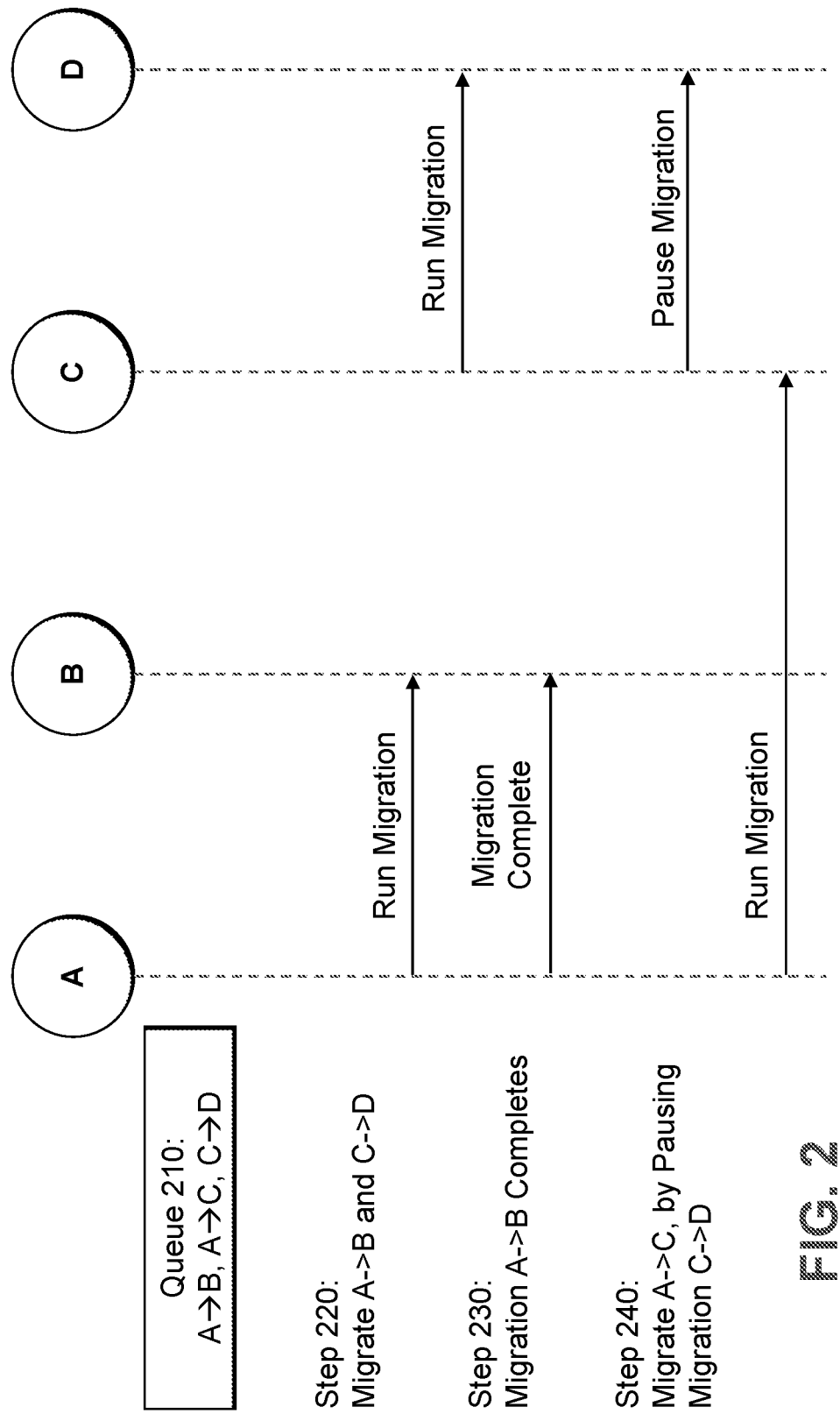
FIG. 2 illustrates a resource usage example, according to some embodiments of the disclosure.

FIG. 2 illustrates a resource usage example 200, according to some embodiments of the disclosure. Generally, FIG. 2 illustrates three exemplary pending migrations from storage pool A to storage pool B, from storage pool A to storage pool C, and from storage pool C to storage pool D, in an order based on an exemplary assigned priority. Since each migration consumes the resources in both the source and destination storage pools, migration can occur in parallel from storage pool A to storage pool B and from storage pool C to storage pool D in parallel, but the migration from storage pool A to storage pool C must wait until the migration from storage pool A to storage pool B completes. When the migration from storage pool A to storage pool B completes, the migration from storage pool A to storage pool C should be started and the migration from storage pool C to storage pool D should be stopped since the latter migration has a lower priority.

Thus, as shown in FIG. 2, a queue 210 comprises the following representative migrations (in order of priority):

A→B, A→C, C→D.

As noted above, at first only migrations from storage volume A to storage volume B and from storage volume C to storage volume D can be performed in parallel. Thus, step 220 comprises the migration from storage volume A to storage volume B and the migration from storage volume C to storage volume D. Thus, these two migrations are started after step 220. At step 230, the migration from storage volume A to storage volume B completes.

During step 240, since the migration from storage volume A to storage volume B has completed, the migration from storage volume A to storage volume C can now be started. The ongoing migration from storage volume C to storage volume D, however, (which has a lower priority) needs to be paused, as shown by the actions following step 240.

Figure 3:
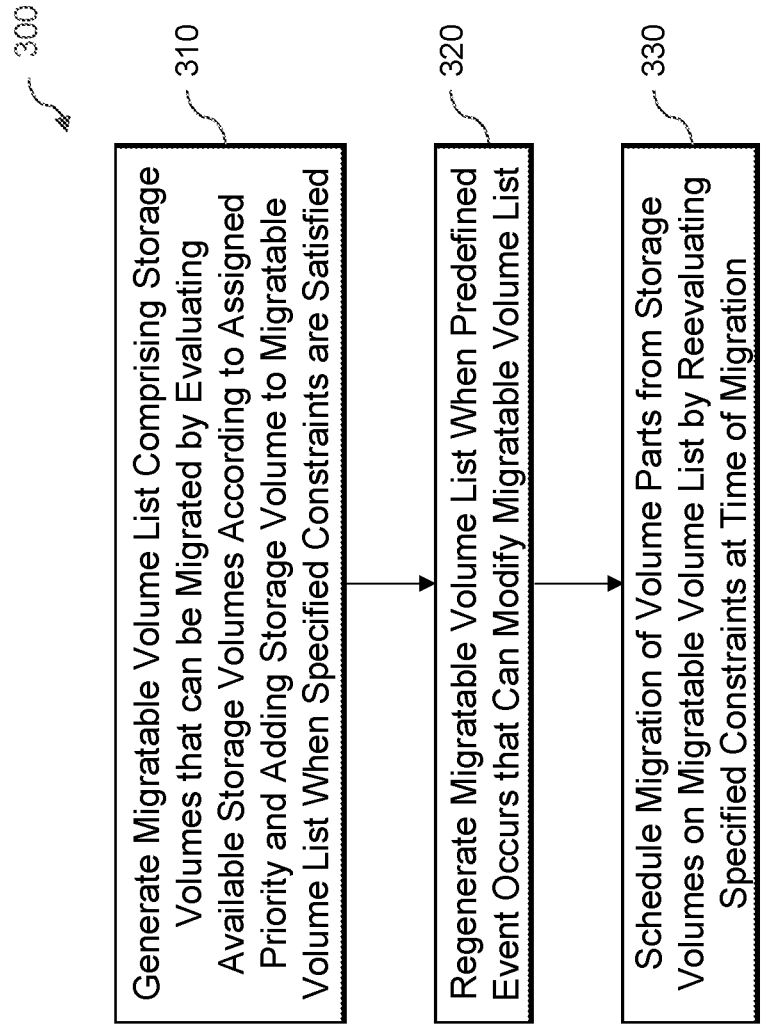
FIG. 3 is a flow diagram illustrating an exemplary implementation of a priority and constraint-based volume migration process, according to one embodiment of the disclosure.

FIG. 3 is a flow diagram illustrating an exemplary implementation of a priority and constraint-based volume migration process 300, according to one embodiment of the disclosure. As shown in FIG. 3, the exemplary priority and constraint-based volume migration process 300 initially generates a migratable volume list 139 during step 310 comprising storage volumes that can be migrated (e.g., currently, at the time the migratable volume list is generated) by evaluating available storage volumes according to their assigned priority and adding a storage volume to the migratable volume list 139 when one or more specified constraints are satisfied.

For example, the constraints may comprise one or more of: resources needed to migrate a given storage volume are not consumed by a storage volume already on the migratable volume list; a source storage volume cannot be a destination storage volume for another migration in a series of scheduled migrations; a given migration includes a storage volume on a non-operational server (or has otherwise been removed from service).

During step 320, shown in dashed outline, the exemplary priority and constraint-based volume migration process 300 optionally regenerates the migratable volume list 139, for example, when a predefined event occurs that can modify migratable volume list 139. For example, the predefined event may comprise one or more of: adding a new storage volume to migrate; changing the priority of a storage volume; finishing the migration of a storage volume; changing a direction of a migration; receiving a user command to one or more of pause a migration, resume a migration and remove a storage volume; and receiving a notification that one or more storage devices are not available. Such references herein to optional steps or elements should not be construed to suggest that other steps or elements are required in other embodiments.

Finally, during step 330, the exemplary priority and constraint-based volume migration process 300 schedules a migration of one or more volume parts from storage volumes on the migratable volume list 139 based on a reevaluation of the specified constraints at the time of migration. In some embodiments, step 330 is performed when the migratable volume list 139 is generated and when a volume part migration completes.

FIG. 4 illustrates exemplary pseudo code for a volume part migration process 400, according to one embodiment of the disclosure. As shown in FIG. 4, the exemplary volume part migration process 400 comprises the following steps:

1. allocate empty volume part in migration destination;
2. copy contents of volume part from source to destination;
  2.1 source data servers each iterate over their mapped parts of volume part, reading data from storage device and sending data to destination data servers;
  2.2 destination data servers write given data at storage device and offset corresponding to offset in volume part;
  2.3 if any new write operations arrive while copying, new write operation is synchronously written to both source and destination;
  2.4 if there is an error (e.g., hardware failure, no more space in destination, etc.) migration of volume part is aborted and source volume part is used as before;
3. when data copying is complete, ownership of serving user I/Os moves to destination group of devices;
  3.1 notify source servers to stop serving I/Os;
  3.2 enable destination servers to serve I/Os;
  3.3 client is notified about new location of volume part; and
  3.4 delete source volume part; and
  3.5 if error occurs in steps 3.1, 3.2, 3.3 or 3.4, Move forward with process, as data finished moving so error is handled as normal error.

The particular processing operations and other network functionality described in conjunction with FIGS. 3 and 4 are presented by way of illustrative example only, and should not be construed as limiting the scope of the disclosure in any way. Alternative embodiments can use other types of processing operations to schedule storage volume migrations based on storage volume priorities and specified constraints. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Among other benefits, the disclosed techniques for scheduling storage volume migrations based on storage volume priorities and specified constraints migrate the storage volumes of the highest priority for which resources are available. In some embodiments, lower priority migrations are not canceled, but storage volumes are migrated in small units (referred to as volume parts), so that the volume parts that have started migrating will finish relatively fast.

In one or more embodiments, the full list of all storage volumes to migrate is processed relatively rarely (e.g., when a migration ends or upon a new migration), and the migratable volume list 139 of migrations is processed only when a volume part migration is finished, so the disclosed techniques for scheduling storage volume migrations is efficient with respect to processing resources.

Figure 5:
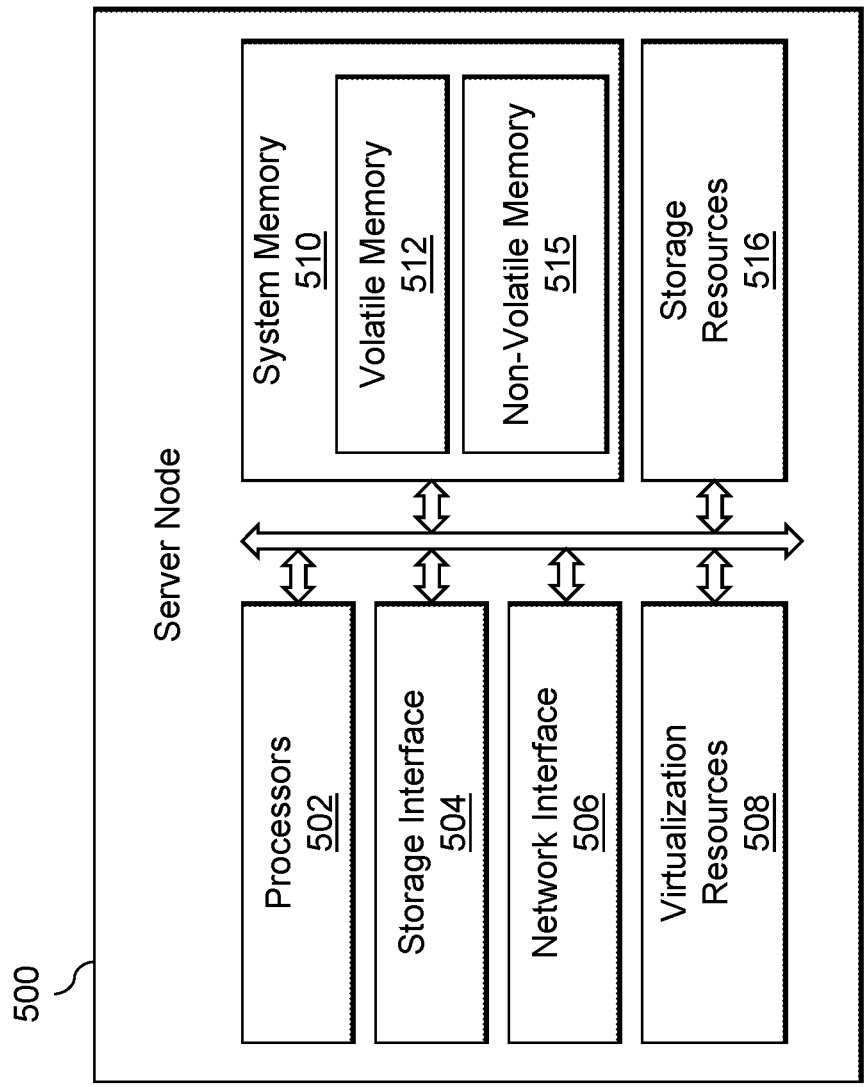
FIG. 5 schematically illustrates framework of a server node which can be implemented in the system of FIG. 1 for hosting a software-defined storage system, according to an exemplary embodiment of the disclosure.

FIG. 5 schematically illustrates a framework of a server node 500 that can be implemented in the system 100 of FIG. 1 for hosting a software-defined storage control system, according to an exemplary embodiment of the disclosure. In particular, FIG. 5 schematically illustrates an exemplary hardware architecture of the server node 130 of FIG. 1, which can host entities of the SDS system of FIG. 1. The server node 500 comprises processors 502, storage interface circuitry 504, network interface circuitry 506, virtualization resources 508, system memory 510, and storage resources 516. The system memory 510 comprises volatile memory 512 and non-volatile memory 515.

The processors 502 comprise one or more types of hardware processors that are configured to process program instructions and data to execute a native operating system (OS) and applications that run on the server node 500. For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware and/or firmware. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), and Fibre Channel. The network interface circuitry 506 enables the server node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, and converged Ethernet adaptors) to support communication protocols and interfaces including, but not limited to, PCIe, DMA and RDMA data transfer protocols.

The virtualization resources 508 can be instantiated to execute one or more services or functions which are hosted by the server node 500. For example, the virtualization resources 508 can be configured to implement the various modules and functionalities of the SDS control systems of FIG. 1, as discussed herein. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well as execute one or more of the various modules and functionalities of the SDS control systems of FIG. 1, as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the SDS control systems and the storage volume migration scheduling modules that employ volume part migration comprise program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of a NAND Flash storage device, an SSD device, or other types of next generation non-volatile memory (NGNVM) devices. The system memory 510 can be implemented using a hierarchical memory tier structure wherein the volatile system memory 512 is configured as the highest-level memory tier, and the non-volatile system memory 515 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include, for example, one or more HDDs and/or SSD storage devices.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
  generating a migratable volume list indicating a plurality of migratable storage volumes of a plurality of available storage volumes that can be migrated by (i) evaluating the available storage volumes according to an assigned priority for each of the available storage volumes and (ii) adding a migratable storage volume of the plurality of available storage volumes to the migratable volume list in response to one or more constraints being satisfied that limit a migration of one or more of the plurality of available storage volumes; and
  scheduling a migration of a volume part of a given migratable storage volume from the migratable volume list based at least in part on a reevaluation of one or more of the constraints;
  wherein the method is performed by at least one processing device comprising a processor coupled to a memory.

2. The method of claim 1, further comprising regenerating the migratable volume list in response to an event occurring that modifies the migratable volume list.

3. The method of claim 2, wherein the event comprises one or more of adding a new storage volume to migrate; changing the priority of at least one available storage volume; finishing the migration of a migratable storage volume in the migratable volume list; changing a direction of a migration; receiving a user command to one or more of pause a migration, resume a migration and remove a migratable storage volume from the migratable volume list; and receiving a notification that one or more storage devices are not available.

4. The method of claim 1, wherein the one or more constraints comprise one or more of: resources needed to migrate a given storage volume are not consumed by a migratable storage volume already on the migratable volume list; a source storage pool cannot be a destination storage pool for another migration in a series of scheduled migrations; a given migration includes a migratable storage volume in the migratable volume list on a non-operational server, and a maximum number of concurrent migrations for each of the migratable storage volumes in the migratable volume list.

5. The method of claim 1, wherein the migratable volume list is sorted by the assigned priority for each of the migratable storage volumes.

6. The method of claim 1, wherein once the migration of a given volume part is scheduled the scheduled migration is not cancelled.

7. The method of claim 1, further comprising pausing a migration of at least one volume part of a particular storage volume having a lower priority than the given storage volume before the scheduled migration of the given storage volume commences when the particular storage volume having the lower priority has a resource conflict with the given storage volume.

8. An apparatus comprising:
at least one processing device comprising a processor coupled to a memory;
the at least one processing device being configured to implement the following steps:
generating a migratable volume list indicating a plurality of migratable storage volumes of a plurality of available storage volumes that can be migrated by (i) evaluating the available storage volumes according to an assigned priority for each of the available storage volumes and (ii) adding a migratable storage volume of the plurality of available storage volumes to the migratable volume list in response to one or more constraints being satisfied that limit a migration of one or more of the plurality of available storage volumes; and
scheduling a migration of a volume part of a given migratable storage volume from the migratable volume list based at least in part on a reevaluation of one or more of the constraints.

9. The apparatus of claim 8, further comprising regenerating the migratable volume list in response to an event occurring that modifies the migratable volume list.

10. The apparatus of claim 9, wherein the event comprises one or more of adding a new storage volume to migrate; changing the priority of at least one available storage volume; finishing the migration of a migratable storage volume in the migratable volume list; changing a direction of a migration; receiving a user command to one or more of pause a migration, resume a migration and remove a migratable storage volume from the migratable volume list; and receiving a notification that one or more storage devices are not available.

11. The apparatus of claim 8, wherein the one or more constraints comprise one or more of: resources needed to migrate a given storage volume are not consumed by a migratable storage volume already on the migratable volume list; a source storage pool cannot be a destination storage pool for another migration in a series of scheduled migrations; a given migration includes a migratable storage volume in the migratable volume list on a non-operational server, and a maximum number of concurrent migrations for each of the migratable storage volumes in the migratable volume list.

12. The apparatus of claim 8, wherein the migratable volume list is sorted by the assigned priority for each of the migratable storage volumes.

13. The apparatus of claim 8, wherein once the migration of a given volume part is scheduled the scheduled migration is not cancelled.

14. The apparatus of claim 8, further comprising pausing a migration of at least one volume part of a particular storage volume having a lower priority than the given storage volume before the scheduled migration of the given storage volume commences when the particular storage volume having the lower priority has a resource conflict with the given storage volume.

15. A non-transitory processor-readable storage medium having stored therein program code of one or more software programs, wherein the program code when executed by at least one processing device causes the at least one processing device to perform the following steps:
generating a migratable volume list indicating a plurality of migratable storage volumes of a plurality of available storage volumes that can be migrated by (i) evaluating the available storage volumes according to an assigned priority for each of the available storage volumes and (ii) adding a migratable storage volume of the plurality of available storage volumes to the migratable volume list in response to one or more constraints being satisfied that limit a migration of one or more of the plurality of available storage volumes; and
scheduling a migration of a volume part of a given migratable storage volume from the migratable volume list based at least in part on a reevaluation of one or more of the constraints.

16. The non-transitory processor-readable storage medium of claim 15, further comprising regenerating the migratable volume list in response to an event occurring that modifies the migratable volume list.

17. The non-transitory processor-readable storage medium of claim 16, wherein the event comprises one or more of adding a new storage volume to migrate; changing the priority of at least one available storage volume; finishing the migration of a migratable storage volume in the migratable volume list; changing a direction of a migration; receiving a user command to one or more of pause a migration, resume a migration and remove a migratable storage volume from the migratable volume list; and receiving a notification that one or more storage devices are not available.

18. The non-transitory processor-readable storage medium of claim 15, wherein the one or more constraints comprise one or more of: resources needed to migrate a given storage volume are not consumed by a migratable storage volume already on the migratable volume list; a source storage pool cannot be a destination storage pool for another migration in a series of scheduled migrations; a given migration includes a migratable storage volume in the migratable volume list on a non-operational server, and a maximum number of concurrent migrations for each of the migratable storage volumes in the migratable volume list.

19. The non-transitory processor-readable storage medium of claim 15, wherein the migratable volume list is sorted by the assigned priority for each of the migratable storage volumes.

20. The non-transitory processor-readable storage medium of claim 15, further comprising pausing a migration of at least one volume part of a particular storage volume having a lower priority than the given storage volume before the scheduled migration of the given storage volume commences when the particular storage volume having the lower priority has a resource conflict with the given storage volume.

* * * * *